US012236000B2

(12) United States Patent
Moisuc et al.

(10) Patent No.: US 12,236,000 B2
(45) Date of Patent: Feb. 25, 2025

(54) REVERSE ENGINEERING DETECTION BY COUNTING CONSECUTIVE INCREMENTAL BRANCH INSTRUCTIONS IN AN INSTRUCTION REGISTER OF A PROCESSOR

(71) Applicants: STMicroelectronics (Alps) SAS, Grenoble (FR); STMicroelectronics (Grenoble 2) SAS, Grenoble (FR)

(72) Inventors: Diana Moisuc, Saint Egreve (FR); Christophe Eichwald, Sassenage (FR)

(73) Assignees: STMicroelectronics (Alps) SAS, Grenoble (FR); STMicroelectronics (Grenoble 2) SAS, Grenoble (FR)

( * ) Notice: Subject to any disclaimer, the term of this patent is extended or adjusted under 35 U.S.C. 154(b) by 168 days.

(21) Appl. No.: 17/644,718

(22) Filed: Dec. 16, 2021

(65) Prior Publication Data

US 2022/0197644 A1 Jun. 23, 2022

(30) Foreign Application Priority Data

Dec. 18, 2020 (FR) ...................................... 2013625

(51) Int. Cl.
*G06F 21/75* (2013.01)
*G06F 9/32* (2018.01)
*G06F 21/52* (2013.01)

(52) U.S. Cl.
CPC .............. *G06F 21/75* (2013.01); *G06F 9/322* (2013.01); *G06F 9/323* (2023.08); *G06F 21/52* (2013.01)

(58) Field of Classification Search
CPC .... G06F 9/322; G06F 11/0721; G06F 11/076; G06F 21/52; G06F 21/75; G06F 21/554
See application file for complete search history.

(56) References Cited

U.S. PATENT DOCUMENTS

| | | | |
|---|---|---|---|
| 5,249,294 A * | 9/1993 | Griffin, III | G06Q 20/341 726/23 |
| 9,906,360 B2 * | 2/2018 | Johnson | H04L 9/0631 |
| 2015/0339480 A1 | 11/2015 | Lutas et al. | |
| 2019/0042740 A1 | 2/2019 | Sherman et al. | |
| 2022/0198000 A1 * | 6/2022 | Weiss | G06F 21/54 |
| 2022/0198005 A1 * | 6/2022 | Moisuc | G06F 3/0673 |
| 2022/0357953 A1 * | 11/2022 | Lee | G06F 9/3806 |

FOREIGN PATENT DOCUMENTS

| | | |
|---|---|---|
| EP | 3438865 A1 | 2/2019 |
| FR | 2895814 A1 | 7/2007 |
| JP | H06284189 A * | 10/1994 |

OTHER PUBLICATIONS

English Translation of EP 3438865 A1, Feb. 6, 2019, 23 pages.*
English Translation of JP-H0628419-A, Retrieved from USPTO's Search on Jul. 25, 2024, 13 pages.*

* cited by examiner

*Primary Examiner* — David J. Huisman
(74) *Attorney, Agent, or Firm* — Slater Matsil, LLP

(57) ABSTRACT

Method for detecting the linear extraction of information in a processor using an instruction register for storing an instruction including an operation code. The method includes monitoring the instructions successively stored in the instruction register including decoding the operation codes, determining the number of consecutive operation codes encoding incremental branches, and generating a detection signal if the number is greater than or equal to a detection threshold.

21 Claims, 2 Drawing Sheets

REVERSE ENGINEERING DETECTION BY COUNTING CONSECUTIVE INCREMENTAL BRANCH INSTRUCTIONS IN AN INSTRUCTION REGISTER OF A PROCESSOR

CROSS-REFERENCE TO RELATED APPLICATIONS

This application claims priority to French Application No. 2013625, filed on Dec. 18, 2020, which application is hereby incorporated by reference herein in its entirety.

TECHNICAL FIELD

The present disclosure generally relates to microelectronics and, in particular embodiments, to protections against reverse engineering.

BACKGROUND

Reverse engineering can be used to study and potentially clone a microcontroller's behavior. A microcontroller typically includes at least one processor and a memory connected via a data bus. Reverse engineering on microcontrollers can include a technique of the "Linear Code Extraction" type where the processor can be forced to execute incremental branch instructions that require an address retrieval circuit of the processor to read the addresses in the memory sequentially (i.e., one after the other, to traverse all of the addresses in the memory).

An example includes a hardware analysis phase, using destratification and advanced microscopy techniques to identify the hardware elements carrying secret information. The hardware analysis phase makes it possible to identify the logic controlling an instruction register (IR) of the processor.

A data extraction phase using Focused Ion Beams (FIB) or fault injection techniques can include modifying a current instruction stored in the instruction register. The current instruction can be forced to contain an operation code corresponding to an incremental branch, the addressing mode of which includes an increment of the address currently being read in the processor.

Thus, the data extraction technique includes a step of imposing incremental branch instructions to force the processor to operate in a linear execution mode (i.e., a mode of operation wherein the processor reads from memory in address order).

The processor will sequentially read the entire memory content, and micro-sensor technologies are used to extract the content read by the processor. For example, data can be extracted from the data bus, via which each item of content of an address is temporarily conveyed from the memory to the instruction register.

Based on the secret content thus extracted by reverse engineering, the software embedded in the microcontroller can be rebuilt, and cloned products can be produced.

Conventional solutions to prevent reverse engineering, using generic hardware protection layers, or inter-operation techniques between two processors, are known, and workarounds to circumvent them have been developed.

It would be advantageous to detect attempts to extract a source code contained in a memory. Moreover, it would be beneficial to respond to such attempts. Furthermore, it would be helpful to make detection and response solutions challenging to identify to complicate the design of possible workarounds.

SUMMARY

In an embodiment, the disclosure proposes a method for detecting the linear extraction of information in a processor using an instruction register for storing an instruction includes an operation code. The method includes monitoring the instructions successively stored in the instruction register including decoding the operation codes, determining the number of consecutive operation codes encoding incremental branch instructions, and generating a detection signal if the number is greater than or equal to a detection threshold.

"Monitoring the instructions successively stored in the instruction register including decoding the operation codes" is understood to mean, for example, systematic and routine reading and decoding of the operation codes of the instructions stored in the instruction register.

Monitoring advantageously does not affect the conventional use of the instruction register as storage for the current instruction being processed in the processor.

"Incremental branch instruction" is understood to mean, for example, an instruction which, once it has been processed by the processor, automatically causes a next instruction stored at a memory address directly consecutive to a memory address of the current instruction to be read.

However, a linear code extraction step of a reverse engineering method produces a number of incremental branch instructions that can be higher than normal (i.e., higher than the detection threshold chosen in this respect).

Thus, monitoring the instructions successively stored in the instruction register and generating the detection signal according to this aspect allow a reverse engineering method, in particular a linear code extraction step, in progress on the processor to be detected and reported.

Moreover, the current instruction is conventionally stored in the instruction register, which is located inside the processor.

Thus, the method according to this aspect can be implemented by direct integration into the processor, which is challenging to identify in reverse engineering. This increases the complexity of the reverse engineering procedure and tends to make this type of procedure non-profitable overall.

In an embodiment, determining the number of consecutive operation codes encoding incremental branches includes comparing the decoded operation codes with a list of operation codes encoding skip branches.

For example, the processor can be provided with an exhaustive list of operation codes encoding skip branches. However, an exhaustive list of the operation codes for the incremental branch instructions is not necessarily provided since the processor can be configured to default to an incremental branch instruction when an operation code is not recognized.

Thus, by comparing the decoded operation codes with the list of operation codes encoding skip branches, it is possible to determine whether an operation code corresponds to an incremental branch instruction and thus monitor the continuity of a series of incremental branches to detect a linear code extraction.

"Skip branch instruction" is understood to mean branch instructions that are not incremental branches, for example, jump, call, or return instructions.

Thus, the list of operation codes can include an operation code encoding a jump instruction, an operation code encoding a procedure call instruction, and an operation code encoding a procedure return instruction.

This corresponds to a list that can be exhaustive or non-exhaustive, depending on the language of the code of the processor, including the main operation codes encoding a skip branch.

In an embodiment, determining the number of consecutive operation codes encoding incremental branches further includes decrementing a value of a counter, previously set to a detection threshold, when an operation code from among the decoded operation codes encodes an incremental branch instruction; resetting the value of the counter to the detection threshold, when an operation code from among the decoded operation codes includes an operation code encoding a skip branch; and the detection signal is generated when the value of the counter is zero.

Using a decrement is more robust, by design, than an increment in the event that a register containing the detection threshold value is forced back to its start point in an attempt to work around the detection method.

More specifically, a decremented counter is set to the value of the threshold, which is a priori not known by the person carrying out reverse engineering; conversely, an incremented counter is a priori set to a zero value.

As a result, the reverse engineering procedure will require additional work to identify the start point of the counter, which increases the complexity of implementing the procedure with the aim of making it non-profitable overall.

In an embodiment, the value of the detection threshold is chosen in conjunction with an implementation of a source code to allow consecutive incremental branch instructions to be executed during normal execution of the source code by the processor.

Thus, the joint choice of the detection threshold and the implementation of the source code procures a good compromise between the expected level of security and the execution performance of the source code. By jointly providing the implementation of the source code and the value of the detection threshold, any generation of a detection signal during the normal operation of the processor can be prevented.

In an embodiment, the source code must comply with the threshold value. If normal execution of the source code triggers a detection signal, then skip branch instructions can be introduced into the source code to interrupt the linearity thereof.

Since the choice of the detection threshold value limits the number of instructions that can be extracted during a reverse engineering procedure, the detection threshold value should advantageously be minimized, potentially by adapting the implementation of the source code in this respect.

In an embodiment, the disclosure proposes a method for protecting against the linear extraction of information includes the detection method defined hereinabove, and includes, in response to the generation of the detection signal, a step forcing the memory address of a next reading operation of the processor to direct to memory locations, the content of which is not confidential.

For example, the step includes resetting an instruction pointer to values of the instruction pointer taken before the generation of the detection signal or commanding access to memory locations, the original content of which is not confidential.

"Non-confidential original content" is understood to mean information that was, for example, originally intended to be transmitted to a third party.

Thus, forcing the processor to read the non-confidential content after the generation of the detection signal ensures that the information extracted during the linear information extraction attempt is not exploitable within the scope of the reverse engineering method.

Moreover, forcing the processor to continue reading the memory during the attempt makes the detection method difficult to identify since the processor a priori continues to operate in a linear information extraction mode which does not reflect the detection of the reverse engineering.

The alternative resetting the instruction pointer (a term well known to a person skilled in the art for a pointer to the address of a current instruction) to previous values makes it possible to force the processor to only read content in the memory that has already been read during the linear extraction (i.e., before the detection signal was generated).

In an embodiment, the disclosure proposes a detecting integrated circuit, which includes a processor. The processor includes an instruction register for storing an instruction having an operation code. The detecting integrated circuit includes a monitoring circuit configured to monitor instructions successively stored in the instruction register and to decode operation codes of the instructions, counter circuit configured to determine a number of consecutive operation codes encoding incremental branches, and generator circuit configured to generate a detection signal if the number is greater than or equal to a detection threshold.

In an embodiment, the counter circuit is configured to compare the operation codes decoded by the monitoring circuit with a list of operation codes encoding skip branches.

In an embodiment, the list of operation codes includes an operation code encoding a jump instruction, an operation code encoding a procedure call instruction, and an operation code encoding a procedure return instruction.

In an embodiment, the counter circuit is configured to decrement a value of a counter, intended to be previously set to the detection threshold when an operation code from among the decoded operation codes encodes an incremental branch instruction, and to reset the value of the counter to the detection threshold, when an operation code from among the decoded operation codes includes an operation code encoding a skip branch and wherein the generator circuit is configured to generate the detection signal when the value of the counter is zero.

In an embodiment, the choice of the value of the detection threshold and implementation of a source code are jointly adapted to allow consecutive incremental branch instructions to be executed during normal execution of the source code by the processor.

In an embodiment, the integrated circuit defined hereinabove further includes a response circuit configured to force the memory address of a next reading operation of the processor to direct to memory locations, the content of which is not confidential, in response to the transmission of the detection signal.

In an embodiment, the response circuit is configured such that it resets an instruction pointer to values of the instruction pointer taken before the generation of the detection signal or commands access to memory locations, the original content of which is not confidential.

In an embodiment, the detector circuit and the response circuit include logic circuit located in a glue logic-type logic circuit region of the processor.

BRIEF DESCRIPTION OF THE DRAWINGS

Other advantages and features of the disclosure will become apparent upon examining the detailed description of implementations and embodiments, which are in no way limiting, and of the appended drawings wherein.

DETAILED DESCRIPTION OF ILLUSTRATIVE EMBODIMENTS

Figure 1:
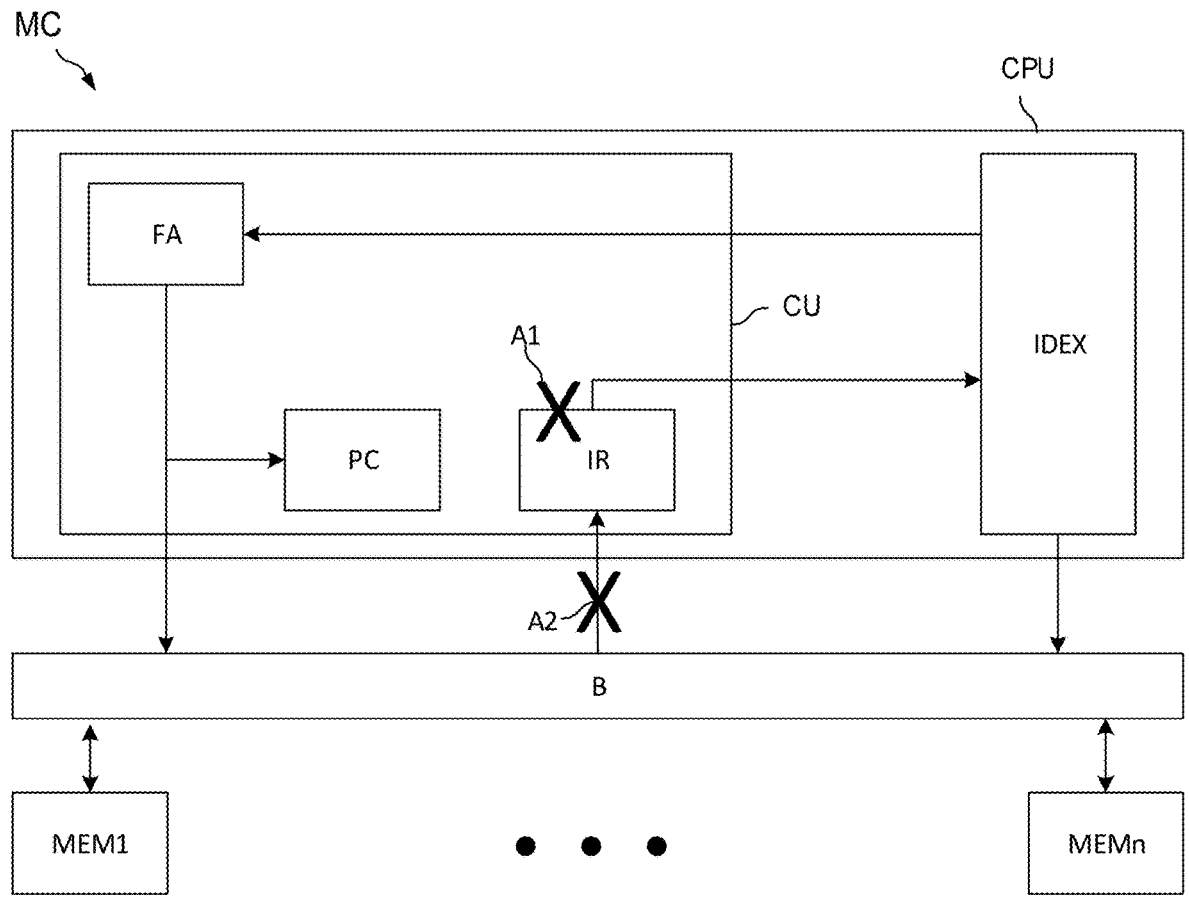
FIG. 1 is a diagram of an embodiment microcontroller.

FIG. 1 illustrates a block diagram of an embodiment microcontroller (MC) during a reverse engineering attempt of the "Linear Code Extraction" (LCE) type. The microcontroller (MC) shown includes a processor (CPU) connected to at least one memory MEM1, MEMn, via a data bus (B). For the sake of simplicity, memory shall be used to designate at least one of the memories MEM1, . . . , MEMn.

The processor (CPU) includes a controller circuit (CU) and a circuit (IDEX) for decoding and executing instructions. In embodiments, the controller circuit (CU) includes a fetch address circuit (FA), an instruction register (IR), and an instruction pointer register (PC), which contains the memory address of the instruction being executed.

During a conventional operating cycle of the processor (CPU), the instruction register (IR) contains a current instruction containing an operation code, better known by the technical term "opcode." The instruction register (IR) is coupled to the circuit (IDEX).

The operation code is a part of a machine language instruction that specifies an operation to be carried out by the processor. In addition to the operation code, most instructions also specify data to be processed, called operands.

The operation code of the current instruction is decoded by the decoding circuit to determine which operation to carry out. The decoding circuit is coupled to the fetch address circuit (FA), which calculates an address of the next instruction to be read as a function of the operation code of the current instruction. The cycle starts over, with the next instruction replacing the current instruction in the instruction register (IR).

The linear code extraction attempt can include altering the operating cycle of the processor (CPU) by attacking the instruction register (IR). The linear code extraction attempt can include a step wherein the instruction register (IR) is forced to store a corrupted instruction.

The corrupted instruction includes, for example, a "hack" operation code (i.e., an operation code imposed during the reverse engineering procedure) allowing for linear code extraction (i.e., an operation code configured to encode an incremental branch instruction).

An "incremental branch instruction" is understood as a current instruction, which, once processed by the processor, automatically causes a next instruction stored at a memory address directly consecutive to the memory address of the current instruction to be read. An incremental branch instruction uses an addressing mode wherein the next address to be read by the processor is defined relative to the address being read by, for example, specifying an amount by which the address being read must be incremented.

A plurality of incremental branch instructions executed in a row is known as linear reading of the memory by the CPU.

Incremental branch instructions are the opposite of skip branch instructions, which cause a skip to a memory address that is independent of the current address or of the last address read by the processor (CPU).

Skip branch instructions are, for example, instructions of the assembly language such as jump instructions, procedure call instructions, and return instructions after a procedure.

The processor (CPU) can be provided with an exhaustive list of the operation codes encoding skip branches. By contrast, no exhaustive list of the operation codes encoding incremental branches is typically provided.

More specifically, the processor (CPU) is configured to default to reading the next instruction stored at a memory address directly consecutive to a memory address of the current instruction when an operation code does not belong to the list of operation codes encoding skip branches.

The hack operation code thus aims to place the processor (CPU) into a default operating mode such that the processor (CPU) reads all of the addresses of the memory MEM1, . . . , MEMn in order.

In practice, the linear code extraction attempt can include a first implementation A1, using, for example, focused ion beams (FIB) on the instruction register (IR) to impose the hack operation code.

Alternatively, implementation A1 can include fault injection techniques to force the instruction register (IR) to impose the hack operation code. Such fault injection techniques provide for physically modifying the circuit (e.g., by adding/removing a connection) to impose a hack operation code in the instruction register (IR).

Moreover, the attempt can further include using a second implementation A2, for extracting logical values from memory. The second implementation A2 uses micro-sensors arranged on a channel on which data flows from the memory to the instruction register (IR), for example, directly on the data bus (B) coupling the instruction register (IR) to the memory. It is thus conventionally possible to read the source code linearly extracted from the memory and temporarily stored in the instruction register (IR).

Figure 2:
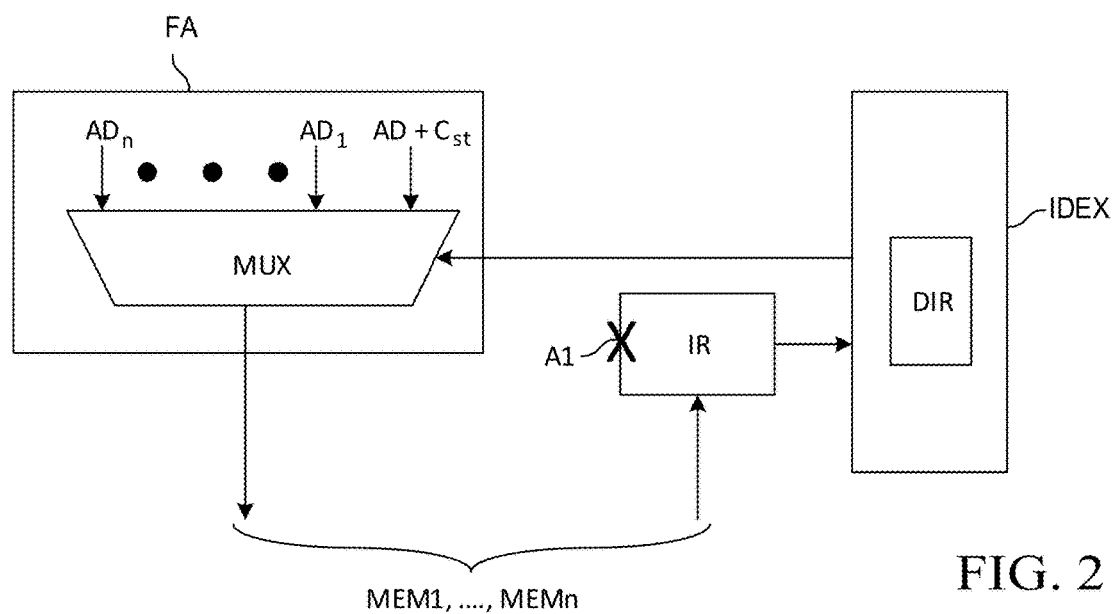
FIG. 2 is a diagram of a fetch address circuit, the register of the instruction pointer, and a detector circuit of the microcontroller in FIG. 1.

FIG. 2 illustrates a block diagram of an embodiment fetch address circuit (FA), the instruction register (IR), the circuit (IDEX), and a detector circuit (DIR) for detecting corruption of the instruction register (IR) of the microcontroller (MC) described with reference to FIG. 1.

In embodiments, the detector circuit (DIR) is configured to report an attempted linear code extraction (LCE), as described with reference to FIG. 1. During the linear code extraction attempt, the first implementation A1 forces a corrupted instruction containing a hack operation code into the instruction register (IR). As a result of this corruption, the decoder separates the hack operation code and the operands. The hack operation code is transmitted to a selector of a multiplexer (MUX) which produces an output address of the fetch address circuit (FA) according to the hack operation code. The hack operation code forces the multiplexer to select the address of the instruction that directly follows the address of the current instruction.

For example, the multiplexer selects the address whose value is equal to the address of the current instruction (AD) plus the size Cst of the current instruction (i.e., the number of memory addresses occupied by the current instruction).

The address of the next instruction is forced to be linearly related to the address of the current instruction, at the expense of other instruction addresses AD1, . . . , ADn that could theoretically also be selected and output from the multiplexer (MUX). Forcing the hack operation code into the instruction register (IR) results in a linear reading of the code from memory.

To implement the detection of this linear code extraction attempt, the detector circuit (DIR) includes a monitoring circuit configured to monitor the instructions successively stored in the instruction register (IR) and to decode the operation codes of the instructions. For example, the monitoring circuit is integrated into a part of the decoding circuit that receives the instructions and decodes the operation codes in the circuit (IDEX).

Moreover, the detector circuit (DIR) further includes a counter circuit configured to determine the number of consecutive operation codes encoding incremental branches. To this end, the counter circuit can, for example, include a counter, the current value of which is representative of the number of consecutive incremental branch instructions.

The linear extraction attempt is detected, for example, when the value of the counter indicates a number of consecutive incremental branch instructions greater than or equal to a detection threshold, and a detection signal is generated as a result.

In embodiments, the detector circuit (DIR) includes a generator circuit configured to output a detection signal if the number of consecutive incremental branch instructions is greater than or equal to the detection threshold.

Furthermore, the value of the detection threshold can be chosen in conjunction with a specific implementation of the source code contained in the memory. In embodiments, the choice of the value of the detection threshold and the implementation of the source code are configured to allow for the "normal" number of consecutively executed incremental branch instructions without triggering the detection signal.

In embodiments, normal operation of the microcontroller uses a normal number of incremental branch instructions that do not trigger the detection signal. Normal operation of the microcontroller is understood to mean the operation for which it was designed, for example, as specified in a manufacturer's user manual (commonly known as a datasheet).

To minimize the value of the threshold, skip branch instructions can be introduced, during the implementation of the source code, to adapt to the chosen detection threshold, to reduce the normal number of incremental branch instructions present in a row in the code.

The normal number of increments of a constant quantity can be obtained automatically by simulating the execution of the source code by the processor (CPU) or upon reading the source code.

Furthermore, a response is advantageously provided to the detection of the linear source code extraction attempt to protect the content of the memory not yet read during the linear code extraction attempt.

A response circuit, for example, included in the detector circuit (DIR), is configured to force the processor (CPU) to read memory addresses includes non-confidential content.

"Non-confidential content" is understood to mean information intended to be transmitted to a third party, which does not provide information that can be used within the scope of the reverse engineering method. The response circuit can, for example, have direct access to the control terminal of the multiplexer (MUX) and is configured to force an address ADn of a next instruction calculated by the fetch address circuit (FA).

Moreover, the detector circuit (DIR) and the response circuit can, for example, be integrated and "hidden" within the processor (CPU).

In embodiments, the detector circuit and response circuit are advantageously in a "glue logic"-type region. More specifically, techniques are known for hiding a logic circuit in such a region.

Thus, one specific advantage of integrating the detector circuit (DIR) among elements of a glue logic-type region is that it makes it difficult to corrupt the detector circuit (DIR).

Figure 3:
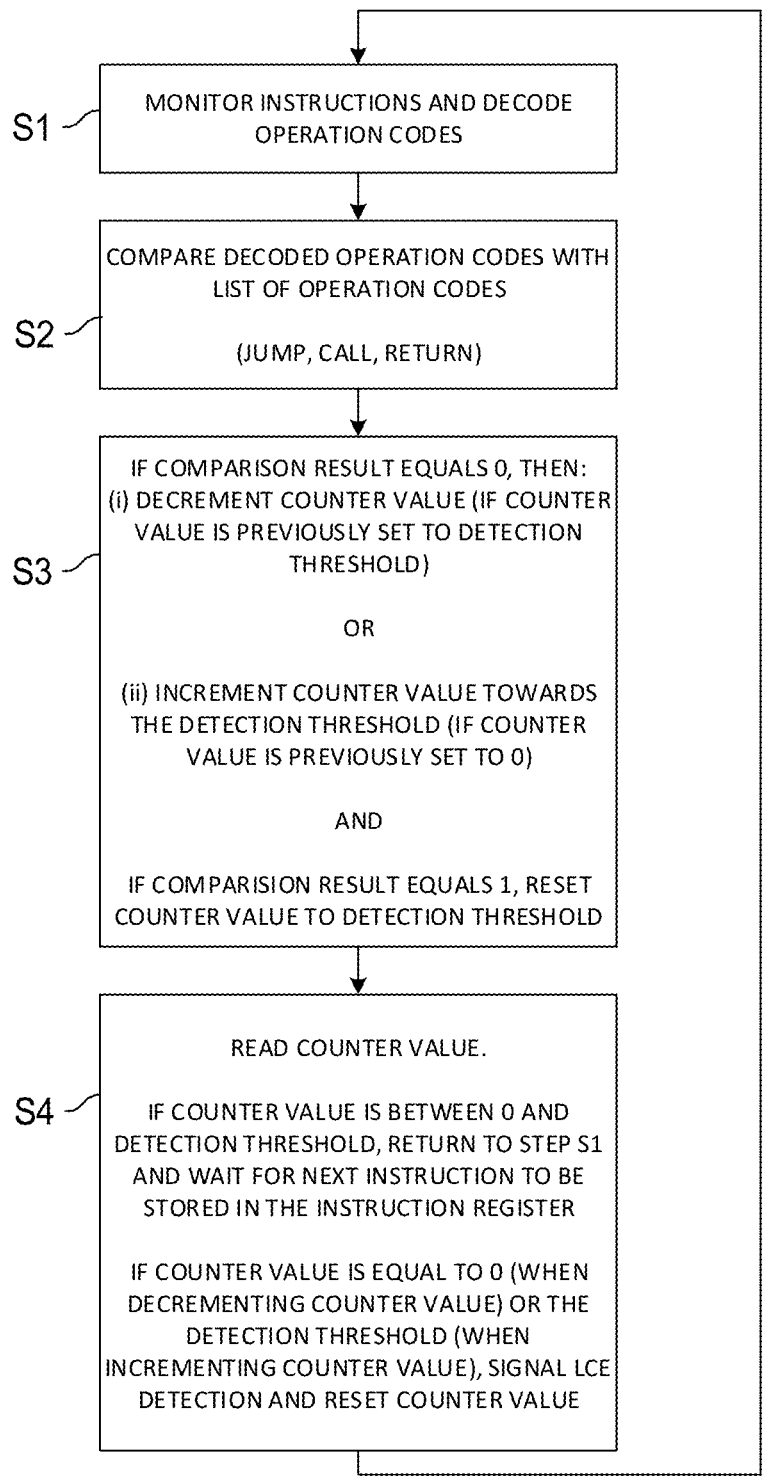
FIG. 3 is a flow diagram of an embodiment method.

FIG. 3 illustrates a flow diagram of an embodiment method implemented by the detector circuit (DIR) described with reference to FIG. 2. Step S1 includes monitoring the instructions successively stored in the instruction register and decoding the operation codes OpC for each new current instruction stored. The monitoring of the instructions successively stored and the decoding of the operation codes OpC can, for example, be implemented by a decoding circuit of the processor.

Step S2 includes producing a comparison Comp between the decoded operation codes OpC and a list of operation codes encoding skip branches. The comparison Comp is used to determine whether the current instruction is an incremental branch or a skip branch instruction.

For example, the comparison Comp can change the result of the comparison to the logical value 1 if the operation code of the current instruction belongs to the list of operation codes. Otherwise, the comparison Comp can change the result of the comparison to the logical value 0. The list of operation codes can, for example, include operation codes corresponding to a jump instruction Jmp, a procedure call instruction Cll, or a procedure return instruction Rtn.

Step S3 includes two different actions depending on the result of the comparison Comp of the previous step S2. On the one hand, if the operation code of the current instruction encodes an incremental branch instruction (i.e., if the result of the comparison Comp is equal to 0), then step S3 includes decrementing a value of a counter Cnt, previously set to the detection threshold Th.

Alternatively, where the counter Cnt is instead previously set to zero, the counter Cnt can be incremented up to the value of the detection threshold Th.

On the other hand, if, conversely, the operation code of the current instruction encodes a skip branch instruction (i.e., if the result of the comparison Comp is equal to 1), then step S3 includes resetting the value of the counter to the detection threshold Th.

Step S4 includes reading the value of the counter Cnt. If the value of the counter Cnt is included between zero and the detection threshold Th, then the method returns to step S1 and waits for the next instruction to be stored in the instruction register (IR).

If the counter is decremented, when the value of the counter Cnt is equal to zero, then step S4 includes generating the detection signal LCEdetec where a value of the detection signal LCEdetec changes, for example, from the logical value 0 to the logical value 1.

Alternatively, if the counter is incremented, it is when the value of the counter Cnt is equal to the detection threshold Th that the detection signal LCEdetec changes from the logical value 0 to the logical value 1.

In both cases, when the detection signal LCEdetec is generated, the counter Cnt is reset.

Alternatively, the counting down (or counting up) of the counter Cnt can be carried out within a range of values included between two bounds arbitrarily offset from the zero point.

More specifically, a non-zero offset value can advantageously be chosen to offset the two bounds of the counter Cnt. This ensures that neither the start point nor the endpoint of the counter Cnt can be known in advance.

For example, the upper bound of the range can be chosen such that it is equal to the detection threshold plus an offset value, and the lower bound of the range can be chosen such that it is equal to the offset value. In this example, the counter is decremented from the upper bound to the lower bound, or incremented from the lower bound to the upper bound.

Moreover, in this alternative embodiment, the detection signal LCEdetec could also be generated if the value of the counter Cnt is not included between the lower bound and the upper bound. Such a generation can be used to oppose an attempt to force the values of the counter Cnt outside the two bounds.

This creates additional work that must be performed by a reverse engineering procedure and increases the complexity of the procedure, with the aim of making it non-profitable overall.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method, comprising:
   determining a threshold value having a value greater than a first number of consecutive operation codes detected during a simulation execution of a source code by a processor;
   monitoring instructions successively stored in an instruction register of the processor, the monitoring comprising systematic and routine reading and decoding of operation codes of the successively stored instructions during a regular execution of the source code by the processor;
   determining a second number of consecutive operation codes corresponding to an encoding of incremental branch instructions during the monitoring, the determining the second number of consecutive operation codes corresponding to the encoding of incremental branch instructions comprising comparing decoded operation codes to a list comprising operation codes corresponding to skip branch instructions;
   generating a detection signal in response to determining that the second number of consecutive operation codes is equal to the threshold value, the determining that the second number of consecutive operation codes is equal to the threshold value comprising determining that a counter is equal to zero based on sequentially decrementing the counter after each consecutive operation code is determined to correspond to an encoding of an incremental branch instruction during the regular execution of the source code, the counter initially set to the threshold value;
   detecting a linear extraction of information attack on the processor in response to the generating of the detection signal and, in response, resetting a next instruction pointer to a value of an instruction pointer associated with instructions between a beginning of the monitoring and immediately before the detecting the linear extraction of information attack; and
   adding skip branch instructions to the source code to interrupt a linearity characteristic of the regular execution of the source code, the number of skip branch instructions to be added to the source code selected to minimize the threshold value while maintaining an execution performance of the source code.

2. The method of claim 1, wherein the list comprising operation codes corresponding to skip branch instructions includes an operation code encoding a jump instruction, an operation code encoding a procedure call instruction, and an operation code encoding a procedure return instruction.

3. The method of claim 1, wherein the determining the second number of consecutive operation codes corresponding to the encoding of incremental branch instructions, comprises:
   determining that a first decoded operation code corresponds to an encoding of an incremental branch instruction during the monitoring;
   decrementing the counter in response to the determining that the first decoded operation code corresponds to the encoding of the incremental branch instruction during the monitoring;
   determining that a second decoded operation code corresponds to an encoding of a skip branch instruction during the monitoring; and
   resetting the counter to the threshold value in response to determining that the second decoded operation code corresponds to the encoding of the skip branch instruction.

4. The method of claim 1, wherein the threshold value is determined as a function of the source code.

5. The method of claim 4, wherein determining the threshold value comprises:
   identifying a normal number of consecutive incremental branch instructions during a simulated execution of the source code; and
   setting the threshold value to be greater than the identified normal number of consecutive incremental branch instructions.

6. The method of claim 1, wherein the method is directly integrated into the processor.

7. The method of claim 1, wherein the monitoring of instructions, the generating of the detection signal, and the resetting of the next instruction pointer are performed by logic circuits located in a glue logic circuit region of the processor.

8. An integrated circuit comprising a processor, the processor comprising:
   an instruction register configured to store instructions comprising an operation code;
   a detector circuit configured to monitor instructions successively stored in the instruction register, the monitoring comprising systematic and routine reading and decoding of operation codes of the successively stored instructions during a regular execution of a source code by the processor;

a counter circuit configured to determine, using a counter, a first number of consecutive operation codes corresponding to an encoding of incremental branch instructions during the monitoring;

a generator circuit configured to generate a detection signal in response to determining that the first number of consecutive operation codes is equal to a threshold value, wherein the processor is configured to detect a linear extraction of information attack on the processor in response to the generating of the detection signal, the threshold value determined as a value being greater than a second number of consecutive operation codes detected during a simulation execution of the source code by the processor, the determining the first number of consecutive operation codes corresponding to the encoding of incremental branch instructions comprising determining that the counter is equal to zero based on sequentially decrementing the counter after each consecutive operation code is determined to correspond to an encoding of an incremental branch instruction during the regular execution of the source code, the counter initially set to the threshold value; and a response circuit configured to reset a next instruction pointer to a value of an instruction pointer associated with instructions between a beginning of the monitoring and immediately before the detecting the linear extraction of information attack in response to the generating of the detection signal, wherein the source code is modified to include additional skip branch instructions to interrupt a linearity characteristic of the regular execution of the source code, the number of skip branch instructions to be added to the source code selected to minimize the threshold value while maintaining an execution performance of the source code.

9. The integrated circuit of claim 8, wherein the determining the first number of consecutive operation codes corresponding to the encoding of incremental branch instructions by the counter circuit comprises comparing decoded operation codes to a list comprising operation codes corresponding to skip branch instructions.

10. The integrated circuit of claim 9, wherein the list comprising operation codes corresponding to skip branch instructions includes an operation code encoding a jump instruction, an operation code encoding a procedure call instruction, and an operation code encoding a procedure return instruction.

11. The integrated circuit of claim 8, wherein the determining the first number of consecutive operation codes corresponding to the encoding of incremental branch instructions, comprises:

determining that a first decoded operation code corresponds to an encoding of an incremental branch instruction during the monitoring;

decrementing the counter in response to the determining that the first decoded operation code corresponds to the encoding of the incremental branch instruction during the monitoring;

determining that a second decoded operation code corresponds to an encoding of a skip branch instruction during the monitoring; and resetting the counter to the threshold value in response to determining that the second decoded operation code corresponds to the encoding of the skip branch instruction.

12. The integrated circuit of claim 8, wherein the detector circuit and the response circuit comprise a logic circuit located in a glue logic circuit region of the processor.

13. The integrated circuit of claim 8, wherein the threshold value is determined as a function of the source code.

14. The integrated circuit of claim 13, wherein determining the threshold value comprises:

identifying a normal number of consecutive incremental branch instructions during a simulated execution of the source code; and setting the threshold value to be greater than the identified normal number of consecutive incremental branch instructions.

15. A processor, comprising:

an instruction register configured to store instructions comprising an operation code;

a detector circuit configured to monitor instructions successively stored in the instruction register, the monitoring comprising systematic and routine reading and decoding of operation codes of the successively stored instructions during a regular execution of a source code by the processor;

a counter circuit configured to determine, using a counter, a first number of consecutive operation codes corresponding to an encoding of incremental branch instructions during the monitoring;

a generator circuit configured to generate a detection signal in response to determining that the first number of consecutive operation codes is equal to a threshold value, wherein the processor is configured to detect a linear extraction of information attack on the processor in response to the generating of the detection signal, the threshold value determined as a value being greater than a second number of consecutive operation codes detected during a simulation execution of the source code by the processor, the determining the first number of consecutive operation codes corresponding to the encoding of incremental branch instructions comprising determining that the counter is equal to zero based on sequentially decrementing the counter after each consecutive operation code is determined to correspond to an encoding of an incremental branch instruction during the regular execution of the source code, the counter initially set to the threshold value; and a response circuit configured to reset a next instruction pointer to a value of an instruction pointer associated with instructions between a beginning of the monitoring and immediately before the detecting the linear extraction of information attack in response to the generating of the detection signal, wherein the source code is modified to include additional skip branch instructions to interrupt a linearity characteristic of the regular execution of the source code, the number of skip branch instructions to be added to the source code selected to minimize the threshold value while maintaining an execution performance of the source code.

16. The processor of claim 15, wherein the determining the first number of consecutive operation codes corresponding to the encoding of incremental branch instructions by the counter circuit comprises comparing decoded operation codes to a list comprising operation codes corresponding to skip branch instructions.

17. The processor of claim 16, wherein the list comprising operation codes corresponding to skip branch instructions includes an operation code encoding a jump instruction, an operation code encoding a procedure call instruction, and an operation code encoding a procedure return instruction.

18. The processor of claim 15, wherein the determining the first number of consecutive operation codes corresponding to the encoding of incremental branch instructions, comprises:
   determining that a first decoded operation code corresponds to an encoding of an incremental branch instruction during the monitoring;
   decrementing the counter in response to the determining that the first decoded operation code corresponds to the encoding of the incremental branch instruction during the monitoring;
   determining that a second decoded operation code corresponds to an encoding of a skip branch instruction during the monitoring; and
   resetting the counter to the threshold value in response to determining that the second decoded operation code corresponds to the encoding of the skip branch instruction.

19. The processor of claim 15, wherein the detector circuit and the response circuit comprise a logic circuit located in a glue logic circuit region of the processor.

20. The processor of claim 15, wherein the threshold value is determined as a function of the source code.

21. The processor of claim 20, wherein determining the threshold value comprises:
   identifying a normal number of consecutive incremental branch instructions during a simulated execution of the source code; and
   setting the threshold value to be greater than the identified normal number of consecutive incremental branch instructions.

* * * * *